(12) United States Patent
Honda

(10) Patent No.: US 9,252,552 B2
(45) Date of Patent: Feb. 2, 2016

(54) GAS LASER OSCILLATOR CAPABLE OF ESTIMATING SEALABILITY OF GAS CONTAINER

(71) Applicant: FANUC CORPORATION, Minamitsuru-gun, Yamanashi (JP)

(72) Inventor: Masahiro Honda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/731,934

(22) Filed: Jun. 5, 2015

(65) Prior Publication Data

US 2015/0372441 A1    Dec. 24, 2015

(30) Foreign Application Priority Data

Jun. 18, 2014    (JP) .................. 2014-125409

(51) Int. Cl.
*H01S 3/22* (2006.01)
*H01S 3/032* (2006.01)
*H01S 3/223* (2006.01)
*H01S 3/04* (2006.01)
*H01S 3/038* (2006.01)
*H01S 3/104* (2006.01)
(Continued)

(52) U.S. Cl.
CPC .............. *H01S 3/032* (2013.01); *H01S 3/036* (2013.01); *H01S 3/0384* (2013.01); *H01S 3/0407* (2013.01); *H01S 3/09702* (2013.01); *H01S 3/09705* (2013.01); *H01S 3/104* (2013.01); *H01S 3/13* (2013.01); *H01S 3/134* (2013.01); *H01S 3/1306* (2013.01); *H01S 3/2207* (2013.01); *H01S 3/2232* (2013.01)

(58) Field of Classification Search
CPC ....... H01S 3/036; H01S 3/134; H01S 3/1306; H01S 3/13; H01S 3/09705; H01S 3/09702
USPC ..................... 372/59, 55, 31, 29.02
See application file for complete search history.

(56) References Cited

U.S. PATENT DOCUMENTS

2005/0018735 A1* 1/2005 Jitsuno ................ H01S 3/223
                                                    372/55
2008/0043799 A1* 2/2008 Egawa ................. H01S 3/036
                                                    372/59

(Continued)

FOREIGN PATENT DOCUMENTS

JP          02036580           2/1990
JP          H09-000405 U       7/1997
(Continued)

*Primary Examiner* — Kinam Park
(74) *Attorney, Agent, or Firm* — RatnerPrestia (57) ABSTRACT

A gas laser oscillator includes an output command part for outputting a power supply output command; a power supply unit for applying a discharge tube voltage corresponding to the power supply output command to the discharge tube to start discharge; a voltage detection part for detecting the discharge tube voltage; a discharge start determination part for determining whether or not the discharge has been started on the basis of a value detected by the voltage detection part when the power supply output command is gradually increased; and a sealability determination part for determining that sealability of the gas container has been reduced when a discharge start time from the application of the discharge tube voltage until when it is determined by the discharge start determination part that the discharge is started exceeds a predetermined first threshold value.

6 Claims, 7 Drawing Sheets

(51) Int. Cl.
*H01S 3/036* (2006.01)
*H01S 3/134* (2006.01)
*H01S 3/13* (2006.01)
*H01S 3/097* (2006.01)

(56) References Cited

U.S. PATENT DOCUMENTS

2008/0144681 A1* 6/2008 Egawa .................... H01S 3/104
372/38.04
2011/0243168 A1* 10/2011 Ikemoto .................. H01S 3/134
372/38.07
2014/0064317 A1* 3/2014 Honda ................ H01S 3/09702
372/61

FOREIGN PATENT DOCUMENTS

| | | |
|---|---|---|
| JP | 2008-004773 A | 1/2008 |
| JP | 2008-153281 A | 7/2008 |
| JP | 2010212553 | 9/2010 |
| JP | 2011-222586 A | 11/2011 |
| JP | 2014-053423 A | 3/2014 |

* cited by examiner

GAS LASER OSCILLATOR CAPABLE OF ESTIMATING SEALABILITY OF GAS CONTAINER

BACKGROUND ART

1. Technical Field

The present invention relates to a gas laser oscillator that oscillates laser using laser gas as a medium.

2. Description of the Related Art

It is important for a gas laser oscillator that oscillates laser using laser gas as a medium to maintain sealability of a gas container for containing the laser gas. For example, in a less sealable gas container, air or moisture is mixed into the laser gas, whereby a composition of the laser gas is changed. As a result, a desired laser output may not be obtained, which leads to poor processing or increased processing time. Further, impedance matching cannot be achieved between a laser power supply side and a discharge load side (matching units, electrodes, discharge tubes, and laser gas in a discharge space), so that overcurrent may flow into the laser power supply, or overvoltage may be applied to the discharge tubes. This may result in breakdown of the power supply unit or the discharge tubes, or alarm stop of the gas laser oscillator in response to abnormality detection.

JP-U-H09-000405 discloses a gas laser oscillator provided with a gas leakage detection device capable of detecting laser gas leakage by comparing a gas pressure before turning off the gas laser oscillator with a gas pressure at a time when it is turned on next. This patent literature also discloses the use of a temperature sensor for measuring a laser gas temperature in order to accurately measure the gas pressures.

JP-A-2008-153281 discloses a gas laser oscillator configured to determine abnormality of a laser gas composition on the basis of a current value output from a power supply unit in a state where a laser gas pressure is lower than that during normal operation.

JP-A-2008-004773 discloses a gas laser oscillator provided with a laser gas determination means that determines the kind of a laser gas on the basis of a relationship between laser gas pressure and electric power supplied to a turbo blower for circulating the laser gas, and an abnormality determination means that determines abnormality of the gas laser oscillator according to a result of the determination.

The known technique described in JP-U-H09-000405 cannot estimate sealability of the gas container unless the gas laser oscillator is stopped for a sufficiently long period of time, and also cannot estimate reduction in the sealability that gradually proceeds along with the use of the container, such as O-ring deterioration. In addition, a temperature sensor is needed to accurately measure the gas pressures, which has been a factor for increased cost.

The known techniques described in JPA-2008-153281 and JP-A-2008-004773 need to exhaust laser gas for each measurement and then supply laser gas again. This increases laser gas consumption, resulting in increased cost. In addition, when the degree of reduction in the sealability of a gas container is very small, an amount of change in a DC current value or an electric power of the turbo blower corresponding to the degree thereof is small, so that measurement error cannot be ignored. Due to this, change in the gas laser composition may not be accurately determined.

JP-A-2011-222586 and JP-A-2014-053423 disclose a technique in which, in a gas laser oscillator configured such that a voltage corresponding to a power supply output command increasing in a stepped manner is applied to discharge tubes, it is determined whether or not discharge has been started in the discharge tubes on the basis of a ratio of a voltage change in the discharge tubes to a power supply output command.

The present inventor has focused on the fact that when a laser gas composition changes, i.e., sealability of the gas container is reduced, discharge occurs less easily, increasing an amount of time needed to start discharge (hereinafter referred to as "discharge start time") and has proposed a gas laser oscillator capable of estimating sealability of the gas container on the basis of the discharge start time.

SUMMARY OF THE INVENTION

According to a first invention of the present application, there is provided a gas laser oscillator, comprising: a gas container in which a laser gas is circulated; at least one of discharge tube arranged in a circulation path of the laser gas; an output command part configured to output a power supply output command; a power supply unit configured to apply a discharge tube voltage corresponding to the power supply output command to the discharge tubs so as to start discharge in the discharge tube; a voltage detection part configured to detect the discharge tube voltage; a discharge start determination part configured to determine whether or not the discharge has been started in the discharge tube on the basis of a value detected by the voltage detection part when the power supply output command is gradually increased; and a sealability determination part configured to determine that sealability of the gas container has been reduced when a discharge start time from application of the discharge tube voltage until when the discharge start determination part determines the start of the discharge exceeds a predetermined first threshold value.

According to a second invention of the present application, the gas laser oscillator according to the first invention further includes a storage part configured to store a number of determinations made by the sealability determination part that the sealability of the gas container has been reduced, wherein the gas laser oscillator is configured to be stopped when the number of the determinations stored in the storage part exceeds a predetermined second threshold value.

According to a third invention of the present application, the gas laser oscillator according to the first or second invention further includes a display device configured to display at least one of the discharge start time and the number of the determinations made by the sealability determination part that the sealability of the gas container has been reduced.

According to a fourth invention of the present application, the gas laser oscillator according to any of the first to third inventions further includes a current detection part configured to detect an output current of the power supply unit, wherein the output command part is configured to, when a value detected by the current detection part exceeds a predetermined third threshold value, reduce the power supply output command and then gradually increase the power supply output command.

According to a fifth invention of the present application, the gas laser oscillator according to the fourth invention further includes a second storage part configured to store, as a number of retry, a number of times in which the value detected by the current detection part has exceeded the third threshold value, wherein the gas laser oscillator is configured such that when the number of retry exceeds a fourth threshold value, a pressure of the laser gas is reduced to start the discharge.

According to a sixth invention of the present application, the gas laser oscillator according to any of the first to fourth inventions is configured such that when a predetermined period of time has elapsed without the determination of start of the discharge by the discharge start determination part after application of the discharge tube voltage, a pressure of the laser gas is reduced to start the discharge.

These and other objects, features and advantages of the present invention will become more apparent in light of the detailed description of exemplary embodiments thereof as illustrated in the drawings.

DETAILED DESCRIPTION OF THE INVENTION

Hereinafter, exemplary embodiments of the present invention will be described with reference to the accompanying drawings. For easier understanding of the invention, the drawings are depicted in different scales as appropriate. In addition, the same reference signs are used for the same or the corresponding constituent elements throughout a plurality of embodiments.

Figure 1:
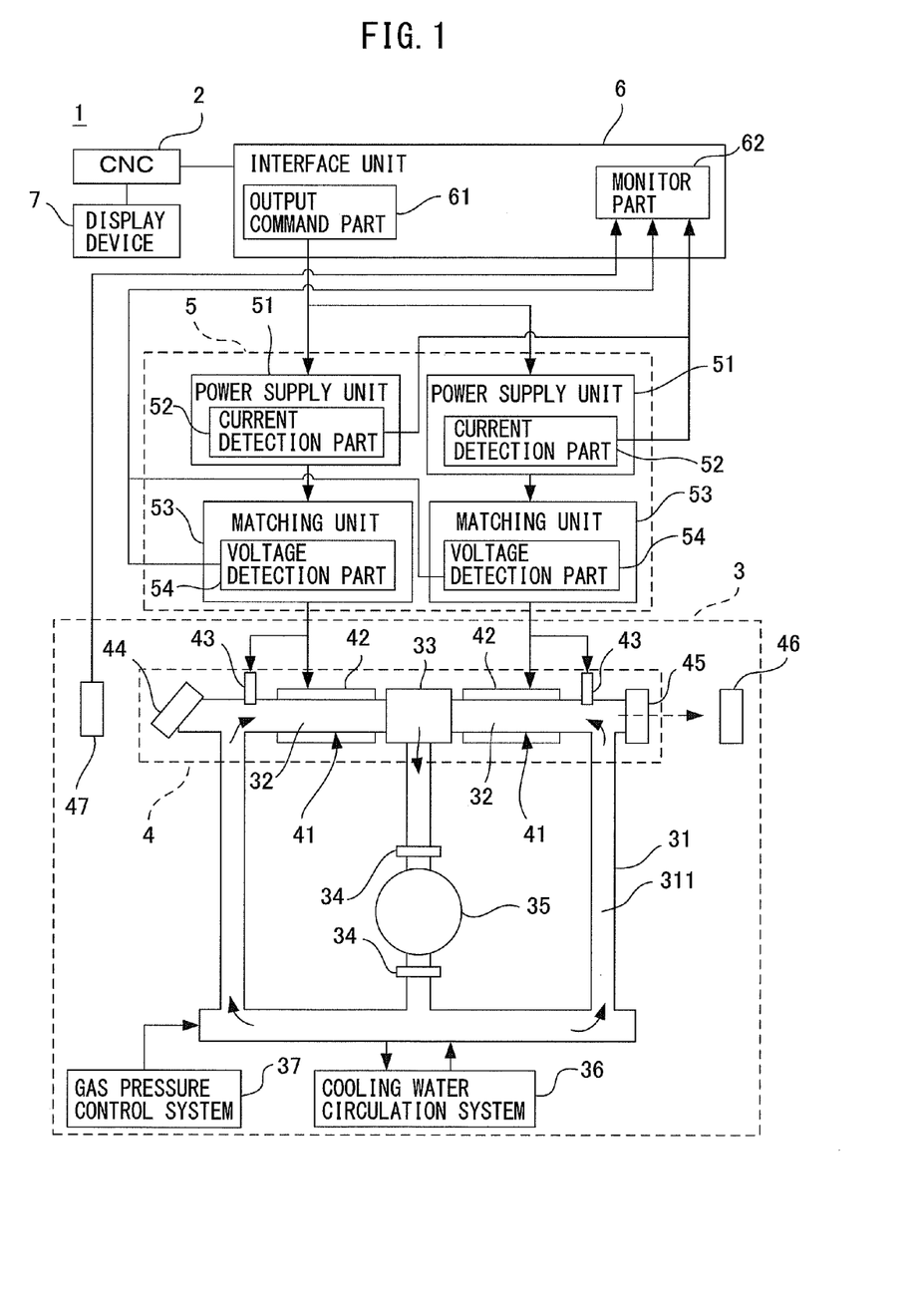
FIG. 1 is a configuration diagram of a gas laser oscillator according to one embodiment of the present invention.

FIG. 1 is a configuration diagram of a gas laser oscillator 1 according to one embodiment. The gas laser oscillator 1 includes a CNC (computer numerical control device) 2 that controls the gas laser oscillator 1, a gas circulation system 3 that circulates a laser gas as a laser medium, a resonator 4 arranged in a circulation path of the laser gas, a power supply unit 5 that supplies electric power to discharge tubes 41 of the resonator 4, an interface unit 6 provided between the CNC 2 and the power supply unit 5, and a display device 7 that visually displays various kinds of information.

The gas circulation system 3 includes a gas container 31 that forms the circulation path of the laser gas. An inner space 311 of the gas container 31 is filled with the laser gas. The laser gas is, for example, a mixture of carbon dioxide, nitrogen, helium, and the like in a predetermined composition ratio. The inner space 311 of the gas container 31 communicates with discharge spaces 32 formed by a pair of discharge tubes 41 connected to each other via a connection holder 33.

The gas circulation system 3 includes a turbo blower 35 that has a suction port near the connection holder 33. The laser gas is adapted to be circulated in the inner space 311 of the gas container 31 and the discharge space 32 by the turbo blower 35, as indicated by arrows in the drawing. On an upstream side (a suction port side) and a downstream side (a discharge port side) of the turbo blower 35 are arranged heat exchangers 34 that cool the laser gas.

The gas circulation system 3 further includes a cooling water circulation system 36 and a gas pressure control system 37. The cooling water circulation system 36 has a function of circulating cooling water for cooling the heat exchangers 34 and the gas container 31. The gas pressure control system 37 has a function of controlling pressure of the laser gas by introducing the laser gas into the gas container 31 from the outside or discharging the laser gas from the gas container 31 to the outside. The cooling water circulation system 36 and the gas pressure control system 37 are controlled by the CNC 2 or another control device (not depicted in the drawing).

The resonator 4 includes the pair of discharge tubes 41, a rear mirror 44 that is a partial reflection mirror arranged on an upstream side of one of the discharge tubes 41 with respect to a flow of the laser gas, and an output mirror 45 that is a partial reflection mirror arranged on an upstream side of the other of the discharge tubes 41. Each of the discharge tubes 41 is provided with a main electrode 42 so that discharge occurs in the discharge space 32 when a certain voltage is applied to each main electrode 42 from the power supply unit 5. Additionally, on the upstream of each of the discharge tubes 41 is provided an auxiliary electrode 43 that assists the discharge by the main electrode 42. When the gas laser oscillator 1 is in operation, the auxiliary electrodes 43, as well as the main electrodes 42, receives electric power supplied from the power supply unit 5.

When discharge occurs in the discharge space 32, the laser gas is excited to emit light. The emitted light is amplified by stimulated emission while being repeatedly reflected between the rear mirror 44 and the output mirror 45. Part of sufficiently amplified laser light passes through the output mirror 45 to be emitted to the outside. The laser light is used, for example, to execute laser processing. On an output side of the output mirror 45 is provided a machine shutter 46 so that the laser light can be shut off, as necessary. In addition, the resonator 4 further includes a power sensor 47 that detects a laser output. A value detected by the power sensor 47 is input to a monitor part 62 of the interface unit 6.

The power supply unit 5 has a function of supplying a high frequency electric power to each of the discharge tubes 41 in response to a power supply output command input from an output command part 61. The power supply unit 5 includes a power supply unit 51 and a matching unit 53. In the embodiment depicted in the drawing, the power supply units 51 and the matching units 53 are provided for the pair of discharge tubes 41, respectively. However, the power supply unit 51 and the matching unit 53 of only one of the discharge tubes 41 will be explained below, since the structures, functions, and effects thereof are the same as each other.

The power supply unit 51 outputs a DC current corresponding to a power supply output command which is input from the output command part 61 of the interface unit 6. The output command part 61 generates a power supply output command in response to a control signal from the CNC 2. The DC current to be output from the power supply unit 51 is converted to a high frequency electric power and input to the matching unit 53. The matching unit 53 matches an output impedance on the side of the power supply unit 5 with an input impedance on the side of the discharge load to apply a voltage corresponding to the power supply output command (hereinafter referred to as "discharge tube voltage") to the discharge tubes 41.

The power supply unit 51 includes a current detection part 52 that detects a DC current which is output by the power supply unit 51. Additionally, the matching unit 53 includes a voltage detection part 54 that detects a discharge tube voltage. Respective values detected by the current detection part 52 and the voltage detection part 54 are input to the monitor part 62 of the interface unit 6.

Figure 2:
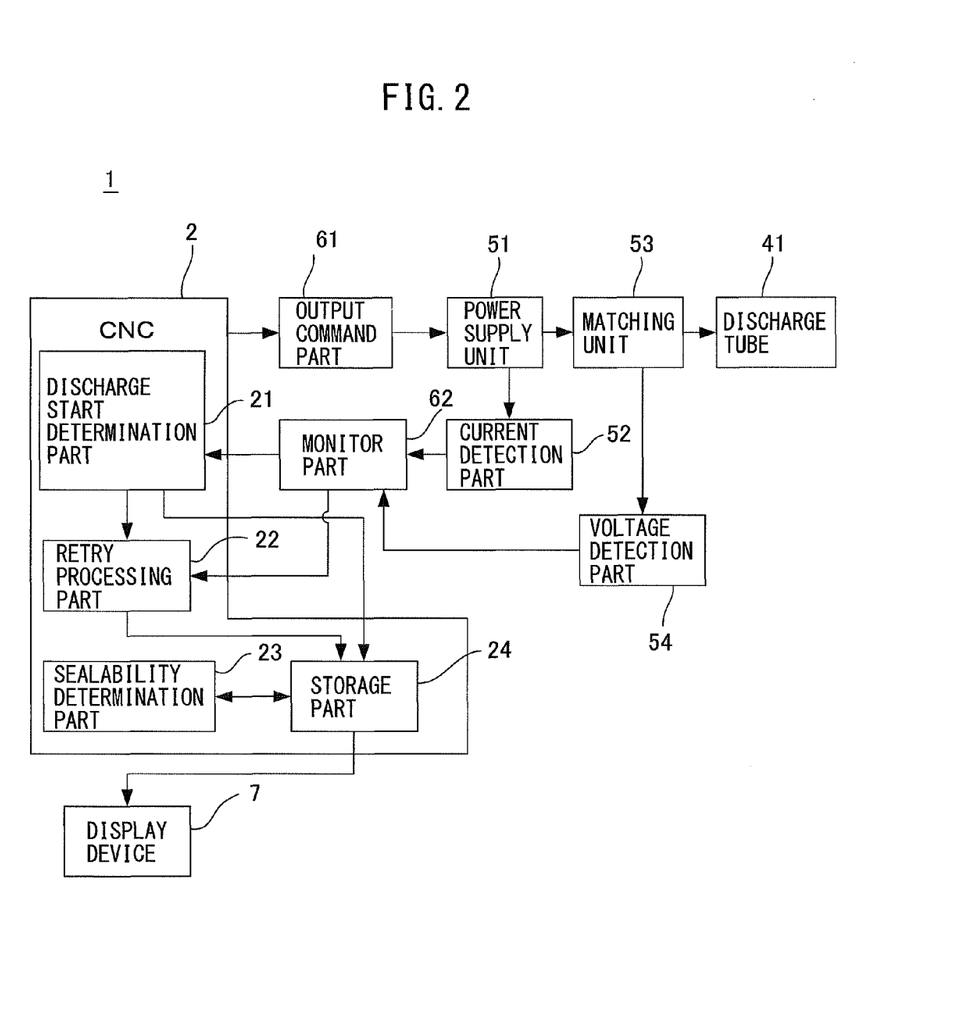
FIG. 2 is a functional block diagram of the gas laser oscillator.

FIG. 2 is a functional block diagram of the gas laser oscillator 1. As depicted in the drawing, the CNC 2 includes a discharge start determination part 21, a retry processing part 22, a sealability determination part 23, and a storage part 24. The CNC 2 has a hardware configuration including a CPU, a ROM, a RAM, and the like. Hereinafter, for convenience, one of the discharge tubes 41 will be explained below. However, those skilled in the art would easily understand that the same concept can be applied to a gas laser oscillator provided with any number of discharge tubes.

The discharge start determination part 21 determines whether or not discharge has been started in the discharge tube 41 when the gas laser oscillator 1 restarts from a standby mode. In one embodiment, the discharge start determination part 21 determines the start of discharge on the basis of whether or not an amount of change in a discharge tube voltage detected by the voltage detection part 54 exceeds a predetermined threshold value when a power supply output command is increased in a stepped manner.

The retry processing part 22 reduces the power supply output command and then executes again a step of increasing the power supply output command in a stepped manner (retry processing), when the DC current output from the power supply unit 51 exceeds a predetermined threshold value during the execution of the restart operation of the gas laser oscillator 1. Specifically, in one embodiment, the retry processing part 22 executes retry processing when a value detected by the current detection part 52 exceeds a predetermined threshold value.

The sealability determination part 23 determines whether or not sealability of the gas container 31 has been reduced on the basis of a discharge start time. In one embodiment, the discharge start time represents a time needed from the application of a discharge tube voltage to the discharge tube 41 until the start of discharge. For example, the discharge start determination part 21 may be used to determine whether or not discharge has been started.

The storage part 24 stores various kinds of information as necessary. For example, the storage part 24 stores the number of determinations made by the sealability determination part 23 that the sealability of the gas container 31 has been reduced. In addition, in one embodiment, the storage part 24 may be configured to store the number of retry. The storage part 24 stores each piece of information in a non-volatile memory so as to retain the stored information even when electric power to the gas laser oscillator 1 is shut off. Alternatively, the storage part 24 may be configured to store information in cooperation with an external storage device which can be operated by a power supply independent from the power supply of the gas laser oscillator 1.

The display device 7 is a display device having a known structure, such as a liquid crystal device (LCD), which displays various kinds of information as necessary. The display device 7 is, for example, an ordinary display device that displays a control program, parameters of the CNC 2, or the like. In one embodiment, the display device 7 may be configured to, for example, display the number of determinations made by the sealability determination part 23 that the sealability of the gas container 31 has been reduced. Additionally, in one embodiment, the display device 7 may be configured to display the discharge start time stored in the CNC 2.

Figure 3:
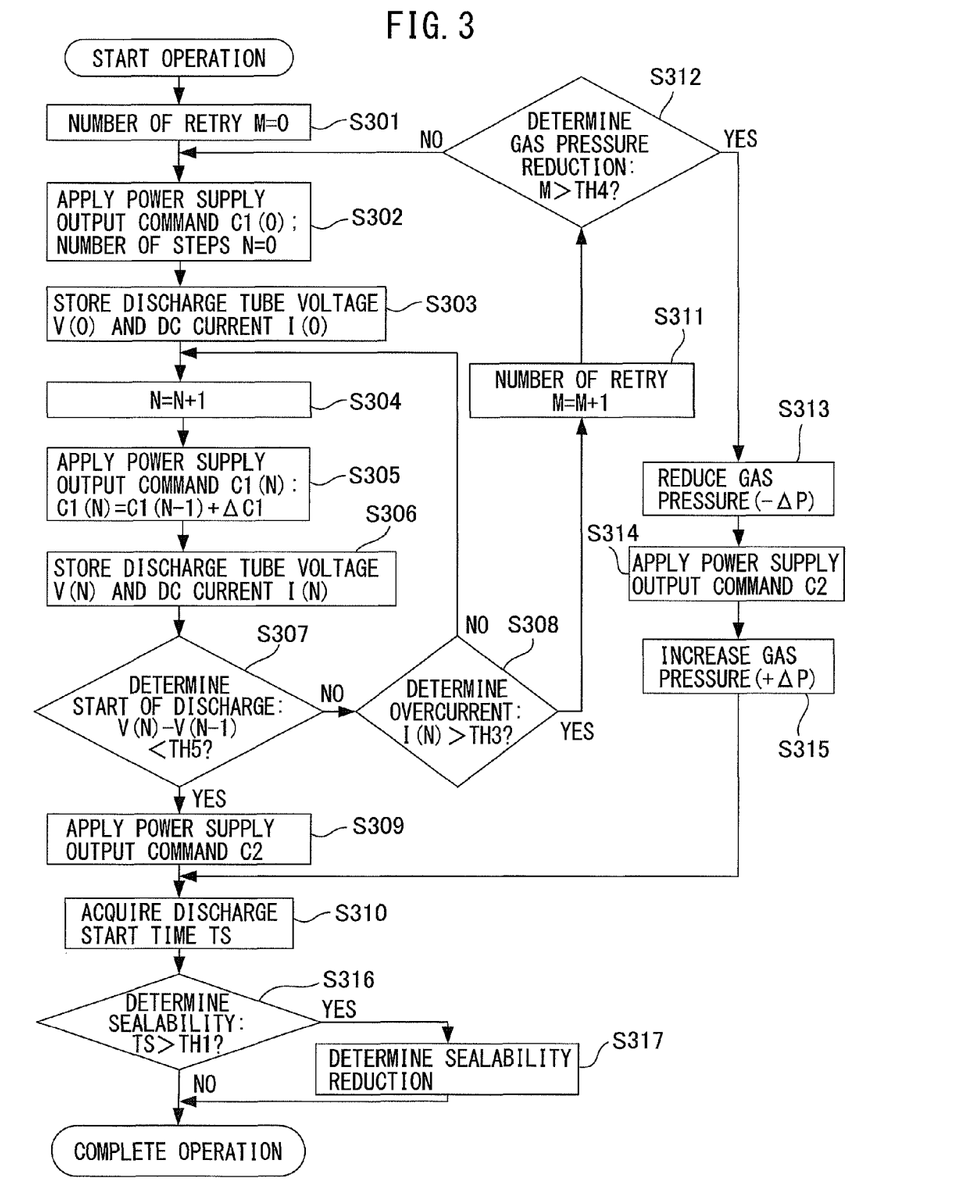
FIG. 3 is a flowchart depicting a process flow in which the gas laser oscillator restarts from a standby mode.

FIG. 3 shows a sealability determination function for determining the sealability of the gas container 31 in a gas laser oscillator 1 according to one embodiment. In the present embodiment, the determination of the sealability is executed when the gas laser oscillator 1 restarts from a standby mode. Accordingly, the flowchart of FIG. 3 depicts a process flow in which the gas laser oscillator 1 restarts from the standby mode.

The restart from the standby mode is started in response to a predetermined control signal to the CNC 2. The "standby mode" means a state where there is no power supply output command from the output command part 61 and discharge does not occur in the discharge tube 41. When the restart operation begins, the number of retry M is set to zero at step S301. In addition, a timer for measuring a discharge start time is activated.

At step S302, the output command part 61 outputs a power supply output command C1(0) for a predetermined period of time $\Delta t$. In addition, the number of steps N is set to zero.

At step S303, the current detection part 52 detects a DC current I(0) that is output from the power supply unit 51 in response to the power supply output command C1(0), and the voltage detection part 54 detects a discharge tube voltage V(0) that is applied to the discharge tube 41. The DC current I(0) and the discharge tube voltage V(0) are input to the monitor part 62 and also stored in the storage part 24 of the CNC 2.

At step S304, after "N+1" is substituted for the number of steps "N," the output command part 61 outputs, at step S305, a power supply output command C1(N) obtained by adding $\Delta C1$ to an immediately preceding power supply output command C1(N−1) for the predetermined period of time $\Delta t$. Thus, in the present embodiment, the output command part 61 is configured to increase the power supply output command by $\Delta C1$ in a stepped manner with the predetermined cycle ($\Delta t$).

At step S306, the current detection part 52 and the voltage detection part 54 detect a DC current I(N) and a discharge tube voltage V(N) corresponding to the power supply output command C1(N). The DC current I(N) and the discharge tube voltage V(N) are input to the monitor part 62 and stored in the storage part 24 of the CNC 2.

At step S307, the discharge start determination part 21 of the CNC 2 determines whether or not a discharge has been started in the discharge tube 41. The discharge start determination is executed on the basis of whether or not a difference between the current discharge tube voltage V(N) and the immediately preceding discharge tube voltage V(N−1) is smaller than a predetermined threshold value TH5. It has been known that when the power supply output command is increased by a predetermined amount in a stepped manner, the rate of change in the discharge tube voltage relative to the power supply output command becomes smaller after the start of the discharge than before the start thereof. Accordingly, it can be determined whether or not the discharge has been started by comparing the amount of change in the discharge tube voltage with the threshold value TH5 every time the power supply output command is increased. See also JP-A-2011-222586 and JP-A-2014-053423. The threshold value TH5 is appropriately determined on the basis of an amount of change in the discharge tube voltage with respect to the power supply output command during normal operation of the gas laser oscillator 1.

When the result of the determination at step S307 is negative, the process goes to step S308 to execute an overcurrent determination. The overcurrent determination is executed on the basis of whether or not the DC current I(N) exceeds a predetermined threshold value TH3 (a third threshold value).

The overcurrent determination is executed in order to prevent the DC current I(N) from becoming excessive to cause an alarm stop of the gas laser oscillator 1. Accordingly, the threshold value TH3 is set to, for example, a value smaller than a DC current value at which an alarm stop of the gas laser oscillator 1 should be implemented.

When the result of the determination at step S308 is negative, the process returns to step S304, to increase the power supply output command by ΔC1 again. The series of processing at steps S304 to S307 are repeatedly executed until when the result of the determination at either step S307 or S308 is affirmative.

When the result of the determination at step S307 is affirmative, the process goes to step S309, where the output command part 61 outputs a power supply output command C2 determined such that auxiliary discharge by the auxiliary electrode 43 is maintained but main discharge by the main electrode 42 does not occur (i.e., the laser output is 0 W). Next, at step S310, a discharge start time TS is acquired as a time needed from the start of restart operation until when the start of discharge is determined.

Figure 4:
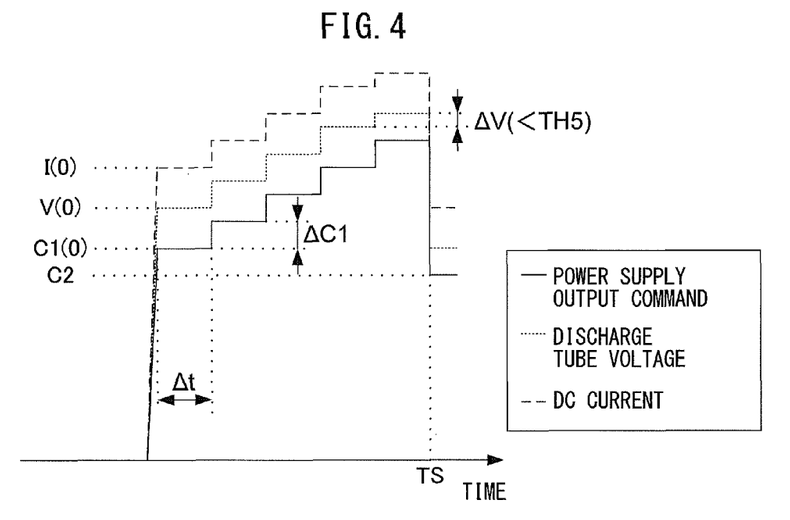
FIG. 4 is a chart depicting an example of characteristics of discharge tube voltage and DC current during a restart operation.

FIG. 4 depicts an example of characteristics of discharge tube voltage and DC current when a restart operation is carried out. FIG. 4 depicts a relationship between the power supply output command, discharge tube voltage, and DC current when the result of the discharge start determination at step S307 is affirmative while the result of the determination at step S308 is not affirmative. In FIG. 4, the power supply output command, the discharge tube voltage, and the DC current are indicated by a solid line, a dotted line, and a broken line, respectively.

As described above, the discharge tube voltage and the DC current each increase in response to the power supply output command increased in a stepped manner. Then, at a point in time when the time TS has passed after the restart operation being started, an amount of change ΔV of the discharge tube voltage becomes smaller than the threshold value TH5, and the discharge start determination part 21 determines the start of discharge (i.e., the result of the determination at step S307 is affirmative). In the case of the example depicted in FIG. 4, discharge is smoothly started in a relatively short period of time. Accordingly, it can be assumed that the sealability of the gas container 31 is sufficiently high.

Referring to FIG. 3 again, when the result of the determination at step S308 is affirmative, the process goes to step S311, where the retry processing part 22 executes retry processing. At step S311, "M+1" is substituted for the number of retry "M." Next, the process goes to step S312 to execute a gas pressure reduction determination.

The gas pressure reduction determination is executed on the basis of whether or not the number of retry M exceeds a predetermined threshold value TH4 (a fourth threshold value). In a normal state, discharge can be started by repeating retry processing a certain number of times. However, for example, when the laser gas composition changes, the number of retry M may exceed the threshold value TH4 without the discharge being started. In this case, gas pressure reduction processing is executed to ensure that discharge is to be started.

On the other hand, when the result of the determination at step S312 is negative, the process returns to step S302, and the output command part 61 outputs a power supply output command C1(0) (an initial value).

Figure 5:
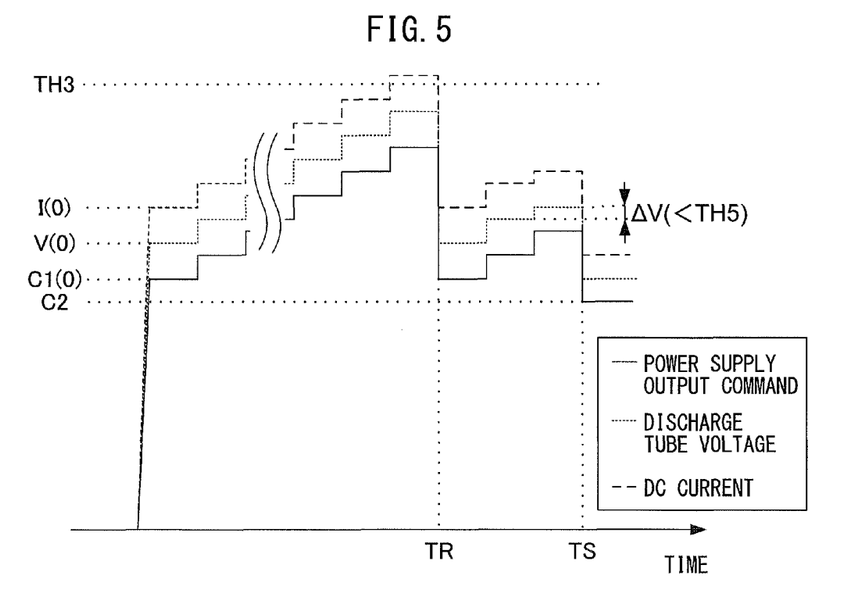
FIG. 5 is a chart depicting another example of characteristics of discharge tube voltage and DC current during a restart operation.

FIG. 5 depicts a second example of characteristics of discharge tube voltage and DC current when a restart operation is carried out. FIG. 5 depicts an example in which retry processing is executed at a time TR and the discharge start determination part 21 determines the start of discharge at time TS. In other words, it can be understood that the DC current exceeds the threshold value TH3 (the result of the determination at step S308 is affirmative) at time TR and, upon the execution of retry processing, the output command part 61 outputs the power supply output command C1(0) again. When retry processing needs to be executed as in the example depicted in FIG. 5, it can be assumed that the sealability is reduced at a relatively small degree. It can also be assumed that reduction in sealability proceeds as the number of executions of the retry processing increases. For example, when the retry processing is carried out more than a predetermined number of times, it can be assumed that an O ring used in the discharge tube 41 or the like is deteriorated and needs to be replaced.

Referring back to FIG. 3, when the result of the determination at step S312 is affirmative, the process goes to step S313 to execute gas pressure reduction processing so as to ensure that discharge can be started. The gas pressure control system 37 discharges laser gas in the gas container 31 to the outside to reduce the gas pressure to a pressure P′ which is lower by ΔP than a gas pressure P in normal state.

At step S314, the output command part 61 outputs a power supply output command C2 being set such that the laser output is 0 W in operation. It has been empirically known that when the power supply output command C2 is applied in the state where the gas pressure has been reduced to P′, it is clear that discharge is to be started. In other words, the laser gas pressure P′ after the execution of the gas pressure reduction processing is set to a gas pressure at which the starting of discharge is ensured when the power supply output command C2 is applied.

After discharge is started, the gas pressure control system 37 supplies, at step S315, laser gas into the gas container 31 to increase the gas pressure to the gas pressure P in normal operation (a laser gas pressure before the execution of the gas pressure reduction processing).

Next, the process goes to step S310 to acquire a discharge start time TS. When discharge is started by executing the gas pressure reduction processing, the discharge start time TS can be considered to be a total time obtained by adding a time needed to execute steps S313 to S315 (a time determined according to a volume of the gas container 31) until when the result of the determination at step S312 is affirmative.

Figure 6:
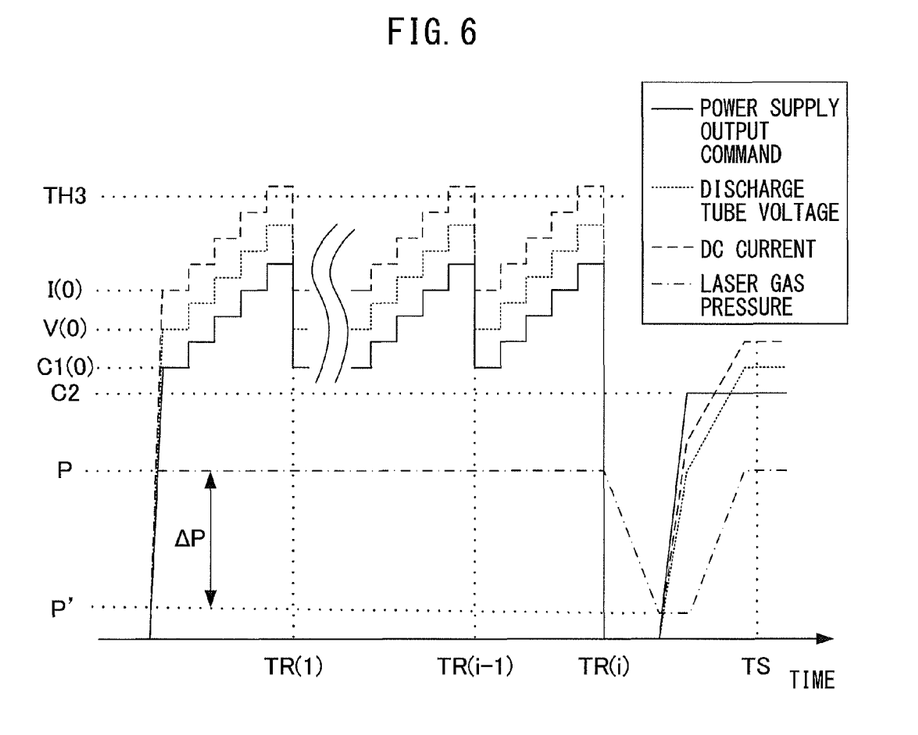
FIG. 6 is a chart depicting another example of characteristics of discharge tube voltage and DC current during a restart operation.

FIG. 6 depicts a third example of characteristics of discharge tube voltage and DC current when a restart operation is carried out. FIG. 6 depicts an example in which retry processing is executed at each time TR(1), TR(2), ... and TR(i) and it is assumed that discharge is started at time TS. In the example of FIG. 6, it can be understood that, at time TR(i), the number of retry M has exceeded the threshold value TH4 (i.e., the result of the determination at step S312 is affirmative) and, upon the execution of gas pressure reduction processing, the gas pressure control system 37 has reduced the gas pressure by ΔP. When it is necessary to execute gas pressure reduction processing as in the example depicted in FIG. 6, it can be assumed that reduction in the sealability is relatively large. For example, it can be assumed that there is a probability of a crack being formed in the gas container 31 or a valve controlled by the gas pressure control system 37 malfunctioning.

Now referring back to FIG. 3, when the discharge start time TS is acquired, the process goes to step S316, where the sealability determination part 23 determines whether or not the sealability of the gas container 31 has been reduced. The determination of the sealability is executed on the basis of whether or not the discharge start time TS exceeds a predetermined threshold value TH1 (a first threshold value).

When the result of the determination at step S316 is affirmative, the process goes to step S317 to determine the reduction in the sealability of the gas container 31, completing the restart operation. On the other hand, when the result of the determination at step 316 is negative, the restart operation is completed with step S317 being bypassed.

The gas laser oscillator 1 according to the present embodiment provides the following advantages:

(1) Every time the gas laser oscillator 1 restarts from a standby mode, it is determined whether or not the sealability of the gas container 31 has been reduced. In this way, the sealability of the gas container 31 can be estimated even when laser processing is continued without completely stopping the gas laser oscillator 1. For example, the sealability of the gas container 31 can be estimated by using a timing of restart of the gas laser oscillator 1 from a temporary standby mode during a series of laser processing which may take a long period of time. In addition, it is possible to determine the reduction in the sealability of the gas container 31 that gradually proceeds during the operation of the gas laser oscillator 1 due to deterioration of the O ring or the like. Therefore, the sealability of the gas container 31 can be more reliably monitored.

(2) By estimating the sealability of the gas container 31 on the basis of the discharge start time TS, reduction in the sealability can be determined even when the degree of reduction in the sealability is very small. Furthermore, the degree of reduction in the sealability can be estimated to some extent according to the length of the discharge start time. Thus, the cause of the reduction in the sealability can be estimated. For example, it can be estimated how far the deterioration of a sealing member such as the O ring advances, according to the increase in the discharge start time TS due to the increasing number of steps N or the execution of retry processing. In addition, when the discharge start time TS increases up to a degree where the number of retry M increases and gas pressure reduction processing is needed, it can be estimated that there is a probability of the gas container 31 or other piping equipment malfunctioning. Furthermore, there is no need for a temperature sensor conventionally used to detect change in a laser gas composition, thus allowing cost reduction.

(3) According to the present embodiment, the reduction in the sealability of the gas container 31 can be determined without a need of replacement of the laser gas. Accordingly, determination of the sealability can be executed in a short time, for example, in 0.5 to 2 seconds, which can therefore shorten a downtime of the gas laser oscillator 1. Additionally, laser gas consumption can be reduced.

(4) The gas laser oscillator 1 is configured such that the display device 7 displays the number of determinations made by the sealability determination part 23 that the sealability of the gas container 31 has been reduced, or the discharge start time TS. The gas laser oscillator 1 may be configured such that the display device 7 further displays a content of required repair work. For example, the display device 7 may display warning, such as the need for replacement of the O ring or the probability of the gas container 31 malfunctioning, or the like. An operator can execute necessary maintenance work or repair work on the basis of the information displayed on the display device 7. Furthermore, in some cases, the operator can presume which part is needed to be repaired on the basis of the information displayed on the display device 7. For example, when the discharge start time TS increases immediately after replacement of a laser gas-containing cylinder, the operator can presume a possible malfunction of the replaced cylinder.

Figure 7:
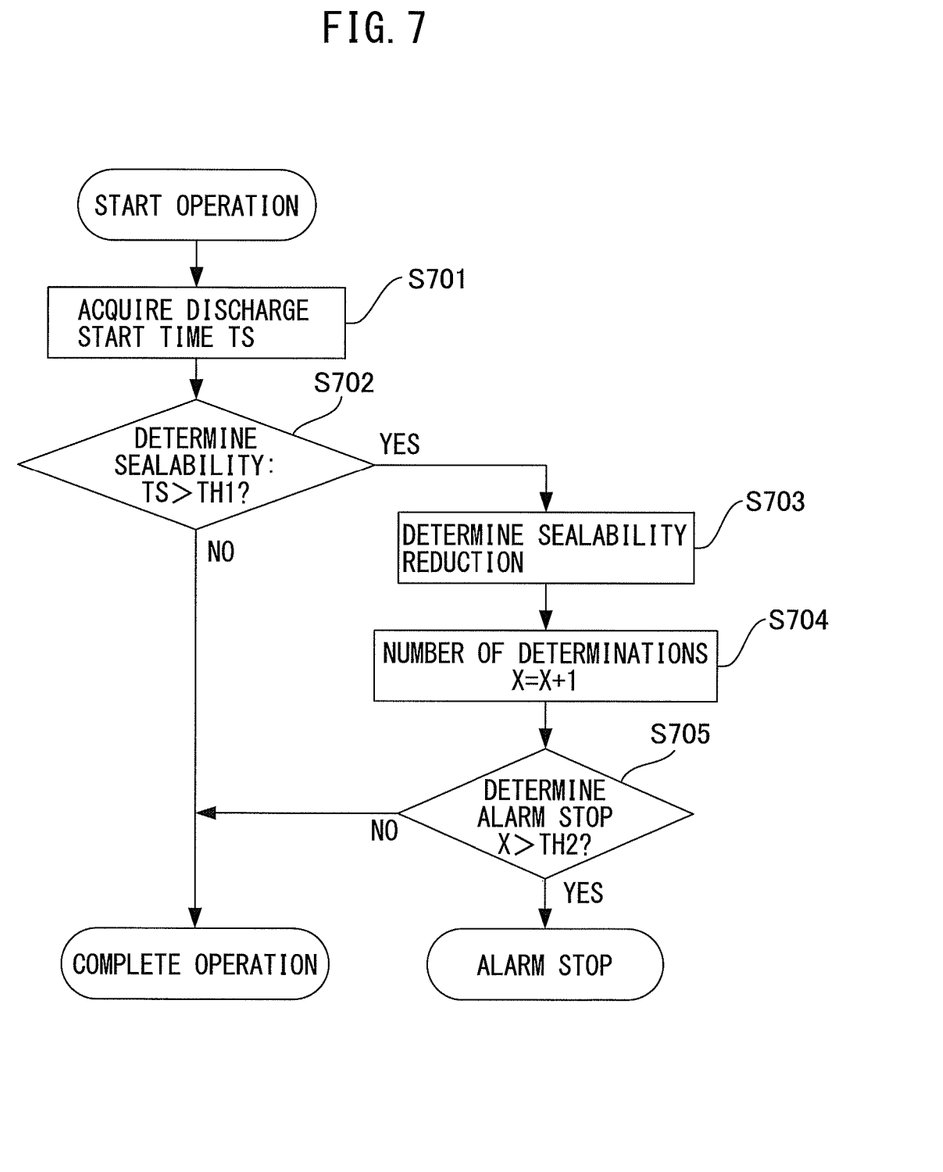
FIG. 7 is a flowchart depicting a process flow of a restart operation in a gas laser oscillator incorporating an alarm stop determination function.

FIG. 7 is a flowchart depicting a process flow of a restart operation in a gas laser oscillator 1 incorporating an alarm stop determination function according to another embodiment. At step S701, a discharge start time TS is acquired according to the method described with reference to FIG. 3. In other words, step S701 corresponds to step S310 of FIG. 3. In FIG. 7, for simplification, steps prior to the acquisition of the discharge start time TS are omitted. Processes at steps S702 and S703 is the same as those at steps S316 and S317 of FIG. 3. The gas laser oscillator 1 is configured such that the restart operation is completed when the result of the determination at step S702 is negative, as in the example of FIG. 3.

In the present embodiment, when reduction in the sealability of the gas container 31 is determined at step S703, the number of determinations of sealability reduction (hereinafter referred to as "the number of determinations") "X" is substituted by "X+1" at step S704. The number of determinations X is stored, for example, in the storage part 24 of the CNC 2. The storage part 24 stores the number of determinations X in a non-volatile memory or an external storage device so that the number of determinations X can be retained even when electric power supplied to the gas laser oscillator 1 is shut off. The number of determinations X is reset when the cause of sealability reduction is eliminated as a result of maintenance or repair.

Next, the process goes to step S705 to execute an alarm stop determination. The alarm stop determination is executed on the basis of whether or not the number of determinations X exceeds a predetermined threshold value TH2 (a second threshold value). When the result of the determination at step S705 is affirmative, it is assumed that there is a probability of significant reduction in the sealability of the gas container 31 that may cause a defect, such as a malfunction of the discharge tube 41, thus the alarm stop of the gas laser oscillator 1 is implemented. On the other hand, when the result of the determination at step S706 is negative, the restart operation is completed.

In the present embodiment, when the sealability reduction is severe, the alarm stop of the gas laser oscillator 1 is implemented. This can prevent the gas laser oscillator 1 from being broken due to the application of overcurrent or overvoltage which is caused by the change in the laser gas composition. In addition, the alarm stop determination is executed every time the gas laser oscillator 1 restarts from a standby mode, similarly to the sealability determination. Thus, even when the gas laser oscillator 1 is in unattended operation, occurrence of accidents can be prevented.

Figure 8:
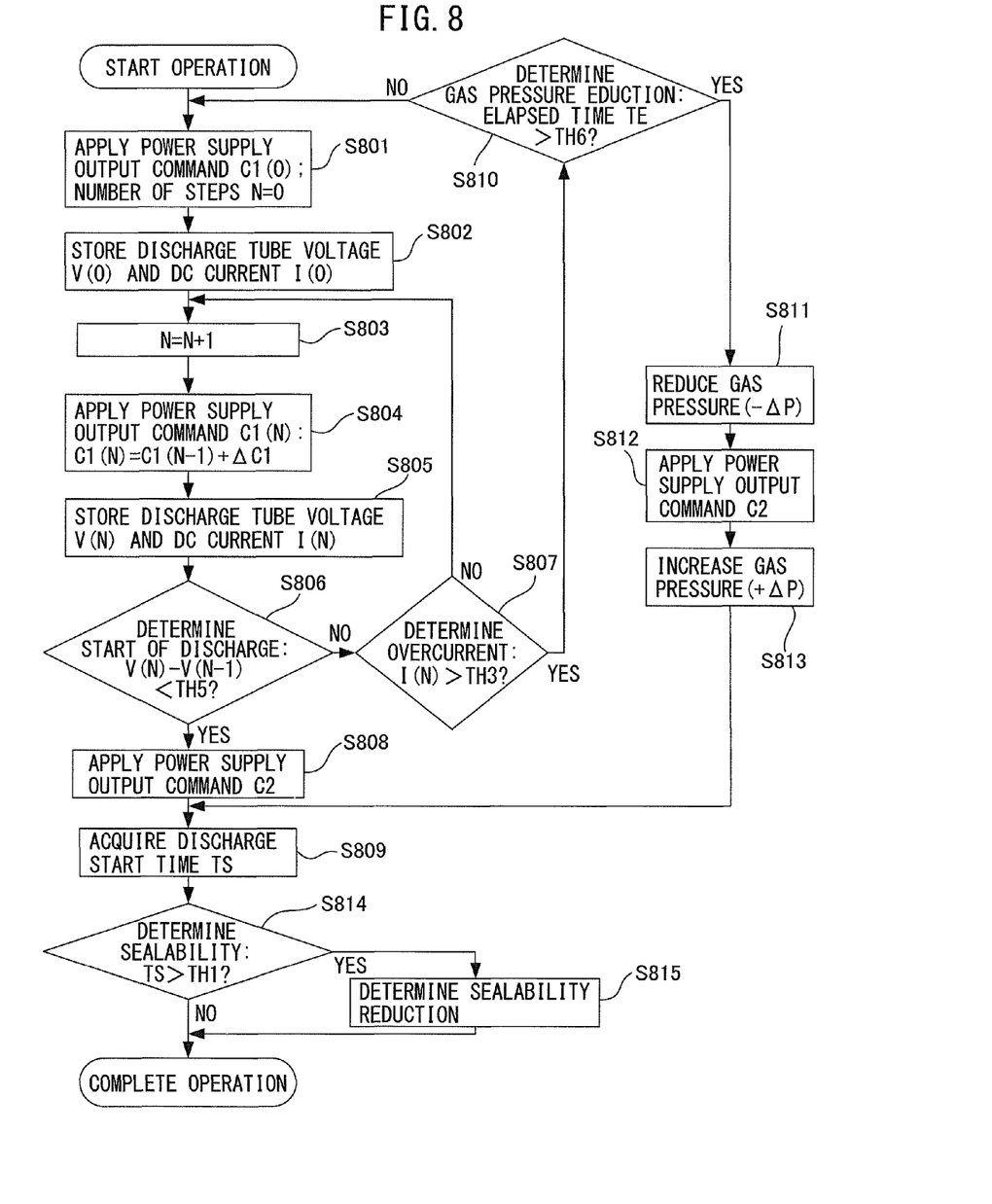
FIG. 8 is a flowchart depicting a process flow of a restart operation in a gas laser oscillator according to a modified example of the invention.

FIG. 8 is a flowchart depicting a process flow of a restart operation in a gas laser oscillator 1 according to a modified example. In this case, the gas pressure reduction determination at step S810 is executed on the basis of an elapsed time TE from the start of restart operation, rather than the number of retry M. Specifically, when the elapsed time TE exceeds a predetermined threshold value TH6, the process goes to step S811 to execute gas pressure reduction processing. Steps other than step S810 are the same as those of the embodiment described with reference to FIG. 3, and thus an explanation thereon will be omitted.

According to this modified example, when the elapsed time TE exceeds the threshold value TH6, the gas pressure reduction processing is executed. Accordingly, even in a state where discharge occurs less easily due to a change in laser gas composition, the gas pressure reduction can ensure the start of discharge, thus allowing the prevention of occurrence of downtime.

EFFECT OF THE INVENTION

In a gas laser oscillator according to embodiments of the present invention, it is determined whether sealability of the gas container has been reduced, on the basis of a discharge start time. This makes it possible to rapidly and accurately estimate the sealability of the gas container.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A gas laser oscillator, comprising:
a gas container in which a laser gas is circulated;
at least one of discharge tube arranged in a circulation path of the laser gas;
an output command part configured to output a power supply output command;
a power supply unit configured to apply a discharge tube voltage corresponding to the power supply output command to the discharge tubs so as to start discharge in the discharge tube;
a voltage detection part configured to detect the discharge tube voltage;
a discharge start determination part configured to determine whether or not the discharge has been started in the discharge tube on the basis of a value detected by the voltage detection part when the power supply output command is gradually increased; and
a sealability determination part configured to determine that sealability of the gas container has been reduced when a discharge start time from application of the discharge tube voltage until when the discharge start determination part determines the start of the discharge exceeds a predetermined first threshold value.

2. The gas laser oscillator according to claim 1, further comprising a storage part configured to store a number of determinations made by the sealability determination part that the sealability of the gas container has been reduced, wherein the gas laser oscillator is configured to be stopped when the number of the determinations stored in the storage part exceeds a predetermined second threshold value.

3. The gas laser oscillator according to claim 1, further comprising a display device configured to display at least one of the discharge start time and the number of the determinations made by the sealability determination part that the sealability of the gas container has been reduced.

4. The gas laser oscillator according to claim 1, further comprising a current detection part configured to detect an output current of the power supply unit, wherein the output command part is configured to, when a value detected by the current detection part exceeds a predetermined third threshold value, reduce the power supply output command and then gradually increase the power supply output command.

5. The gas laser oscillator according to claim 4, further comprising a second storage part configured to store, as a number of retry, a number of times in which the value detected by the current detection part has exceeded the third threshold value, wherein the gas laser oscillator is configured such that when the number of retry exceeds a fourth threshold value, a pressure of the laser gas is reduced to start the discharge.

6. The gas laser oscillator according to claim 1, wherein the gas laser oscillator is configured such that when a predetermined period of time has elapsed without the determination of start of the discharge by the discharge start determination part after application of the discharge tube voltage, a pressure of the laser gas is reduced to start the discharge.

* * * * *